United States Patent [19]

Ream et al.

[11] 4,088,788

[45] May 9, 1978

[54] SALIVA STIMULATING CHEWING GUM COMPOSITION

[75] Inventors: Ronald L. Ream, North Aurora; David M. Moore, Lombard, both of Ill.

[73] Assignee: Wm. Wrigley Jr. Company, Chicago, Ill.

[21] Appl. No.: 753,841

[22] Filed: Dec. 23, 1976

Related U.S. Application Data

[63] Continuation-in-part of Ser. No. 694,024, Jun. 7, 1976, abandoned.

[51] Int. Cl.$^2$ ............................................. A23G 3/30
[52] U.S. Cl. ......................................... 426/3; 426/548
[58] Field of Search ........................................ 426/3–6, 426/548, 804

[56] References Cited

U.S. PATENT DOCUMENTS

| | | | |
|---|---|---|---|
| 3,352,689 | 11/1967 | Bilotti | 426/3 |
| 3,657,424 | 4/1972 | Aktins | 426/74 |
| 3,681,087 | 8/1972 | Johnson | 426/3 |
| 3,826,847 | 7/1974 | Ozawa et al. | 426/3 |

*Primary Examiner*—Jeanette M. Hunter
*Attorney, Agent, or Firm*—McCaleb, Lucas & Brugman

[57] ABSTRACT

Chewing gum composition for use by persons to stimulate salivation while exercising, comprising the combination of at least 3 per cent by weight of an organic acid selected from the group consisting of adipic, ascorbic, citric, fumaric, lactic, malic and tartaric acids, and saccharin. The organic acid and saccharin combination provides a synergistic saliva stimulating effect. A further synergistic effect is provided by combining a high level of dextrose with the organic acid to improve the hygroscopicity and shelf life. Sodium and potassium salts are included to help replenish those salts lost in perspiration.

7 Claims, No Drawings

SALIVA STIMULATING CHEWING GUM COMPOSITION

CROSS REFERENCE TO RELATED APPLICATION

This application is a continuation-in-part of applicants' application Ser. No. 694,024 filed June 7, 1976, now abandoned.

BACKGROUND OF THE INVENTION

1. Field of the Invention

This invention relates to chewing gum and more particularly to flavored chewing gum having a combination of ingredients enabling it to stimulate salivation synergistically beyond that attributable to the act of chewing or attributable to the salivation effect of the ingredients alone, to reduce fatigue and to replenish body salts.

2. Description of the Prior Art

Chewing gum is used by athletes and other persons while exercising to relieve nervous tension. Chewing ordinary gum for a prolonged exercise period sometimes causes a dry mouth condition known as "cottonmouth". Exercising, of course, causes muscular fatigue, and loss of essential potassium and sodium salts through perspiration. Shelf life, that is, the ability to remain soft and readily chewable in storage, is important.

Known gum compositions typically contain some form of chewable gum base, a softener, a flavoring ingredient, and a sweetener which can be either natural or artificial. While certain organic acids derived from natural products such as fruits, vegetables, plants and milk, stimulate salivation, to be effective for this purpose, they have to be used in such high concentrations (above 3%) that people would object to the strong, sour taste. One example of such an organic acid, which is an excellent salivating agent, is citric acid. Straight lemon juice, containing 5 to 8 percent citric acid, is too sour to use, as is, and must be diluted substantially for use in foods and beverages. In the low concentrations normally found in foods and beverages, citric acid is not a very effective salivation agent.

Chewing gum is an ideal medium for the controlled release of salivating agents, quick energy sugars, and sodium and potassium salts, for athletes or other persons engaged in strenuous exercise. However, prior to the present invention, no gum composition had been developed which could do all of these things.

No one to the applicants' knowledge has been able to solve the problem of putting a sufficiently high concentration of one of these organic acids in a gum composition to provide a high salivary stimulation and still have a tolerable taste. The only example which has come to the applicants' attention is the chewing gum composition disclosed in Johnson U.S. Pat. No. 3,681,087 where sticks of gum containing citric acid are dusted with miraculin powder, an odd substance which has the peculiar, taste-inverting characteristic of making sour things taste sweet. This is exactly the opposite of the effect which is needed in a saliva stimulating gum composition which should be quite tart for maximum salivation, but not objectionably so.

Aktins and Attaway U.S. Pat. No. 3,657,424 is another example of prior art which discloses a commercial, bottled citrus drink employing orange, grapefruit, lemon, lime, or other acid fruit juices. Reference is made to use by athletes or other persons for replacing the loss of body fluids which results from exercising or working in high temperature environments. Calcium, sodium and potassium ions are included as supplements to make up for loss of these ions in perspiration. These citrus juices are very diluted and lack the concentration required for producing any salivation effect. Citrus juices, marketed in a can or bottle cannot serve the same purpose as chewing gum. A professional athlete can chew gum while playing football, basketball or hockey to obtain extended slowrelease benefits therefrom, but obviously cannot carry a bottled beverage into play.

Further examples of the state of the art are shown in Ogawa and Terasawa U.S. Pat. No. 3,826,847, and Bilotti U.S. Pat. No. 3,352,689. Both relate to chewing gums. Neither discloses any salivation stimulating percentage (above 3%) of any organic acid. The Ogawa et al patent has only a single example illustrating about 0.2 percent tartaric acid which is insufficient for salivation. The Bilotti patent does not mention any organic acid ingredient at all. The gums disclosed in these patents are totally ineffective to act as salivary stimulants other than that which would be attributable to the act of chewing itself.

Further, no chewing gum compostion known to applicants includes ingredients which replenish fatigue-related body salts such as potassium and sodium ions lost in perspiration during exercise.

Conventional chewing gum products tend to lose moisture and harden in storage, notwithstanding the fact that some of them contain hygroscopic ingredients for enhancing shelf life. It is a common expectation that an old stick of gum will be dried out to the point where it is tough, hard, and even brittle.

SUMMARY OF THE INVENTION

Accordingly, it is a principal object of the invention to provide a good tasting chewing gum composition having the ability, when used in the ordinary way, to stimulate salivation to a degree beyond that attributable to the mere act of chewing and thereby eliminate the dry, so-called "cottonmouth" condition experienced with conventional chewing gum products; to reduce muscular fatigue by providing a quick source of energy; to replenish a portion of the body salts normally lost in perspiration; and to have improved shelf life.

Other objects and advantages of the invention will be apparent from the following description, which discloses a preferred embodiment thereof.

DESCRIPTION OF THE PREFERRED EMBODIMENT

A chewing gum composition typically includes a gum base, flavoring additives, emulsifying agents, a sweetener, and sometimes coloring ingredients, among others. Into such a gum composition, the present invention incorporates three additional features, namely, a saliva stimulating and acid-masking combination of ingredients, a source of energy to reduce fatigue, and a source of potassium and sodium salts to replenish those lost in perspiraion during exercise.

The present invention utilizes a heretofore unrecognized synergistic saliva stimulating effect of combining saccharin with high percentages — above 3% — of certain organic acids. The saliva stimulating effect exceeds that of either the saccharin or the organic acid alone.

Specifically, the organic acids, which, with saccharin, will produce the desired salivation effect are one or more of those selected from the group consisting of adipic, ascorbic, citric, fumaric, lactic, malic and tartaric acids. The term saccharin as used herein includes saccharin itself, saccharin acids, and saccharin salts such as sodium saccharin which we prefer.

The chewing gum composition of this invention is primarily intended for use by athletes and other persons during strenuous physical exercise. It is well-known that athletes engaged in competitive efforts chew gum to relieve tension. Chewing, whether it be gum, tobacco, betel nut, or a stick of wood, are known means of relaxation. The present invention incorporates a unique combination, namely, a high level of organic acids such as those enumerated above, comprising 3 percent or more of the total gum composition, and a high percentage of saccharin to stimulate salivation. In addition, high levels of dextrose are incorporated to provide both a quick energy source and a hygroscopic agent to improve shelf life. And potassium or sodium salts, or both, are incorporated for slow, controlled release with the other ingredients.

The organic acids which we prefer in the practice of this invention occur in natural products although, as a practical matter, they may be synthesized for low cost mass production. Adipic acid occurs in beet juice. Ascorbic acid is found in citrus fruits, hip berries, and fresh tea leaves. Citric acid is present in lemon, lime and grapefruit juices, to name a few sources. Fumaric acid is found in many plants. Lactic acid makes sour milk tart. Malic acid is found in unripe fruits, maple juice, and apples. And tartaric acid occurs in fruit and vegetable tissues.

The following examples will specifically list citric acid as the organic acid ingredient but it will be understood that any one or combination of the other acids listed above may be substituted with the same beneficial results.

One example of the chewing gum composition of the present invention, employing the combination of high levels of organic acids and saccharin, and a high dextrose level, comprises the following ingredients on a weight basis: Gum base, from 10 percent to 95 percent; dextrose syrup, from 0 percent to 25 percent; granulated dextrose, from 0 percent to 80 percent; citric acid, from 3 percent to 10 percent; a softener such as glycerine, from 0 percent to 25 percent; an emulsifier and softener such as lecithin, from 0 percent to 10 percent; sodium saccharin, from 0.01 percent to 0.3 percent; soluble food grade potassium salts, from 0 percent to 4 percent; and a sodium salt, from 0 percent to 4 percent. Additionally, conventional flavors (from 0.1 percent to 6 percent) and coloring ingredients can be added as desired. Within the specified ranges, the optimum levels of chewing gum ingredients are determined empirically, depending on the particular end product desired.

It is well-known that the presence of a high level of citric acid (and the other acids enumerated), above about 3% of the total weight, makes a gum product unpleasantly sour. Similarly, a high level of saccharin or other sweetener makes it too sweet. For these reasons, neither of these two ingredients is used separately at high levels in gum compositions. However, their combined use in the present invention, at the high levels stated, provides the excellent desired result, namely, effective saliva stimulation. It should be noted that while citric acid is a known saliva stimulant, saccharin compounds alone are not thought to have that attribute and thus are not typically used for that purpose. In fact, saccharin has been documented as a negative saliva stimulant. However, when both an organic acid and saccharin are combined in the high levels herein disclosed, the resultant combination has a synergistic effect, providing saliva stimulation which greatly exceeds that provided by either the acid or the saccharin alone. Thus, the combination of these two ingredients increases saliva flow, reduces or eliminates "cotton-mouth" inherent with prolonged chewing while exercising, and results in a pleasant-tasting, tart-flavored gum product. This is an especially important bonus factor for those engaged in highly competitive physical exercise, such as athletes, who chew gum for prolonged periods to relieve tension.

Another advantage of this invention, namely improved shelf life, is in our discovery that the combination of dextrose and the organic acids named have a synergistic hygroscopic effect. Thus, in addition to supplying quick energy and improved salivation, they attract moisture from their surroundings and greatly improve the shelf life of the gum composition over conventional compositions. The herein disclosed gum composition, once formulated into a gum product and stored, can readily absorb and retain moisture from the air allowing the final gum product to hold moisture, stay fresh, and have a much greater shelf life than prior art gums.

Relative to the inclusion in the gum of a potassium salt or a sodium salt, or both, such salts are lost in perspiration. Replenishment of such salts tends to reduce dehydration of muscle cells and retards fatigue. Replacement of some of those body salts is provided in the present invention by including them in the gum composition. It will be understood that any of the following potassium and sodium salts can be utilized.

| | |
|---|---|
| Potassium bi-sulfate | Sodium acetate |
| Potassium bi-tartrate | Sodium bi-sulphate |
| Potassium carbonate | Sodium carbonate |
| Potassium chloride | Sodium citrate |
| Potassium phosphate - (mono & di-basic) | Sodium gluconate |
| Potassium pyro phosphate | Sodium phosphate |
| Potassium stearate | Sodium sulfate |
| Potassium sulfate | Sodium tartrate |
| Potassium sulfite | |
| Potassium tri poly phosphate | |

It should be noted that the presence of too high a level of either the potassium or sodium salts listed will adversely affect the taste of the gum product.

The preferred formula for the chewing gum composition of the present invention is as follows:

| Ingredient | Per Cent By Weight |
|---|---|
| Base | 25.0 |
| Dextrose syrup | 9.88 |
| Dextrose (granulated) | 54.75 |
| Citric Acid | 6.0 |
| Glycerine (softener) | 2.0 |
| Lecithin (emulsifier and softener) | 0.5 |
| Sodium saccharin (powdered) | 0.2 |
| Flavors | 1.25 |
| Postassium salts | 0.27 |
| Sodium salts | 0.25 |

It will be understood that if dextrose in syrup form is not utilized in formulating the gum composition, the addition of some form of moisture will be necessary to assist in the manufacture of such gum products. More-over, the percentage of granulated dextrose should be increased.

The above-described gum composition is illustrative of many specific embodiments of the invention. Other gum compositions can readily be devised in accordance with the principles disclosed without departing from the spirit and scope of the invention. For example, where salivary stimulation only is required, the addition of the potassium and sodium salts can be eliminated.

The embodiments of the invention in which an exclusive property or privilege is claimed are defined as follows:

1. A chewing gum composition essentially comprising gum base; a sweetener; flavoring additives; a palatable and safe organic acid selected from the group consisting of adipic, ascorbic, citric, fumaric, lactic, malic and tartaric acids, said organic acid being capable of stimulating salivation beyond that attributable to the act of chewing food and constituting at least 3 percent by weight of the final gum composition; and saccharin from 0.01% to 0.3% by weight of the final gum composition.

2. The chewing gum composition of claim 1 wherein said saccharin compound is sodium saccharin.

3. The chewing gum composition of claim 1 wherein said sweetener is dextrose.

4. The chewing gum composition of claim 1 including potassium salts up to about 4 percent by weight of the final gum composition.

5. The chewing gum composition of claim 1 including sodium salts up to about 4 percent by weight of the final gum composition.

6. A chewing gum composition comprising on a weight basis from about 10 percent to about 95 percent gum base, from about 0 percent to about 25 percent dextrose syrup, from about 0 percent to about 80 percent granulated dextrose, from about 3 percent to about 10 percent of an organic acid selected from the group consisting of adipic, ascorbic, citric, fumaric, lactic, malic and tartaric acids, from about 0.01 percent to about 0.3 percent sodium saccharin, and effective amounts of flavoring and softening agents.

7. A chewing gum composition comprising the following on a weight percent basis:
gum base:25.0
dextrose syrup:9.88
granulated dextrose:54.75
citric acid:6.0
glycerine:2.0
lecithin:0.5
sodium saccharin:0.1
flavors:1.25
potassium salt:0.27
sodium salt:0.25.

* * * * *